UNITED STATES PATENT OFFICE.

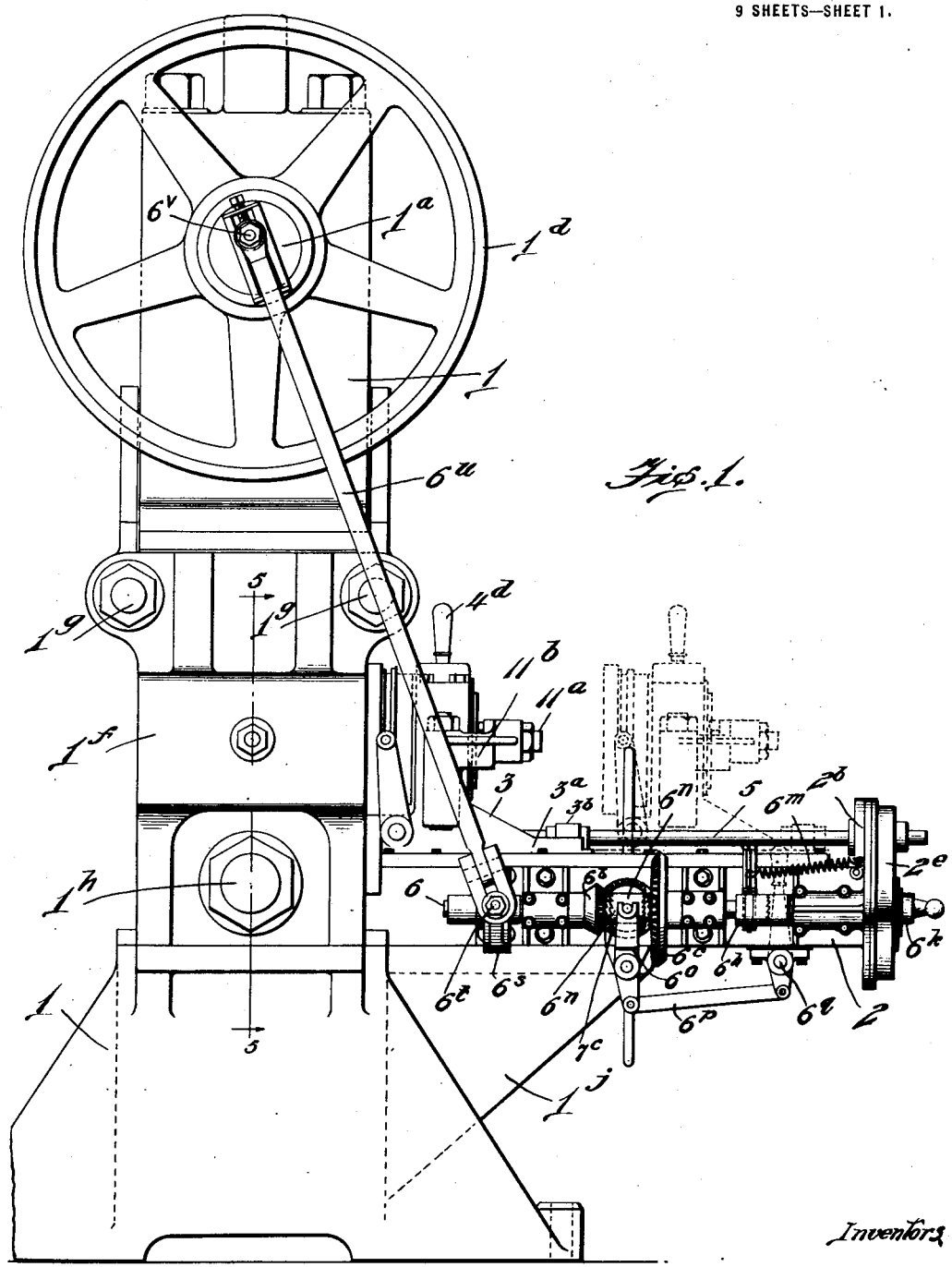

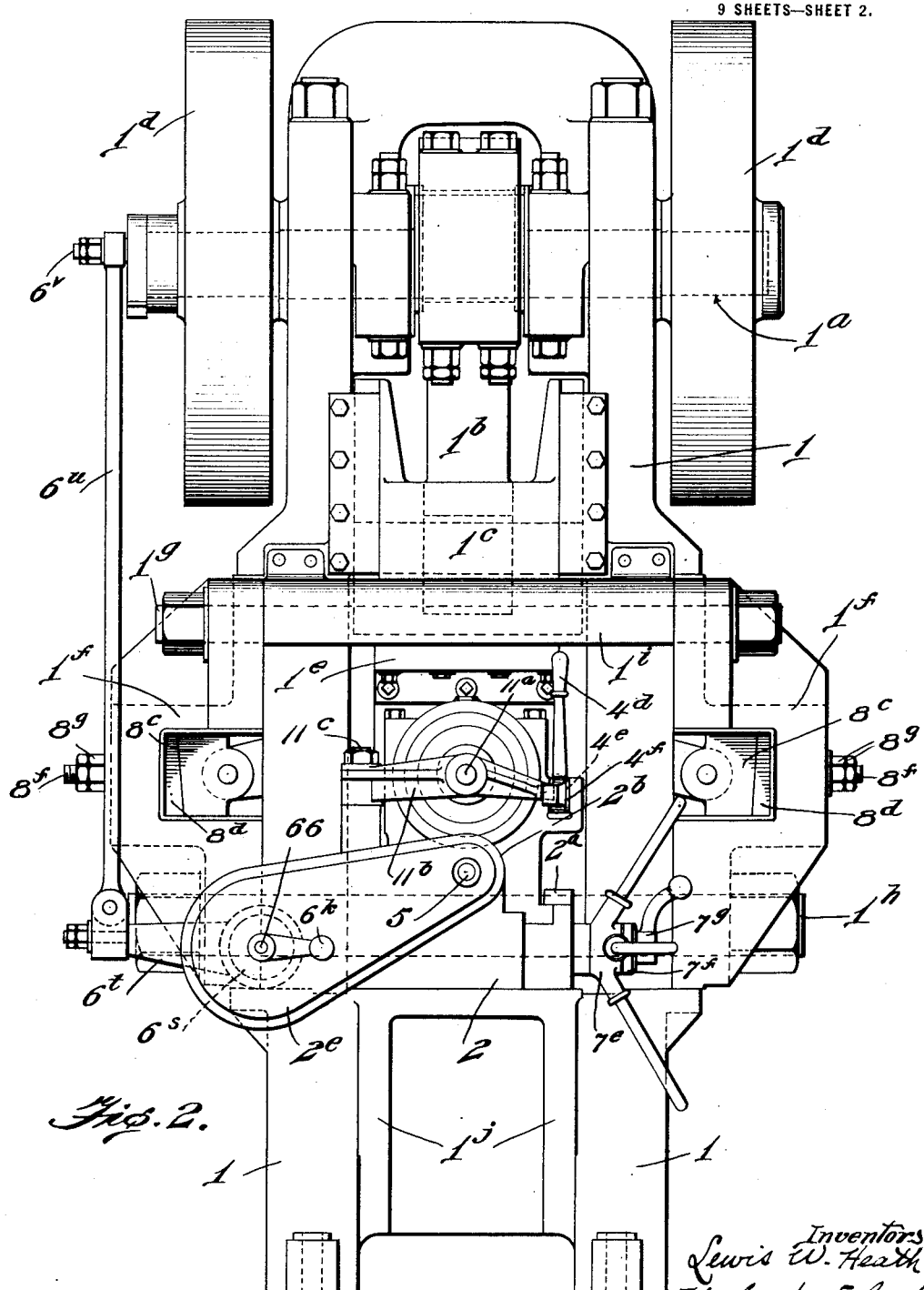

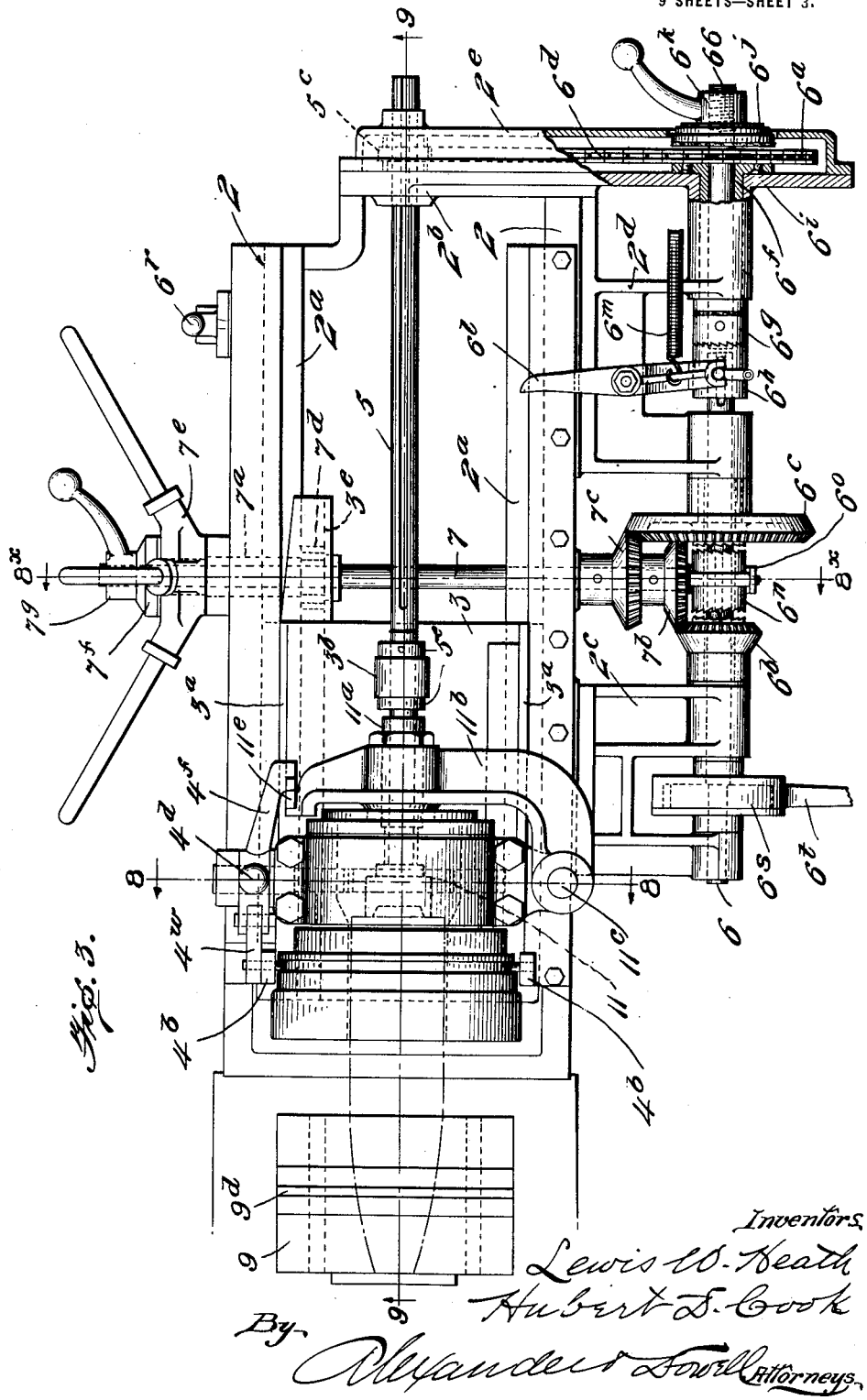

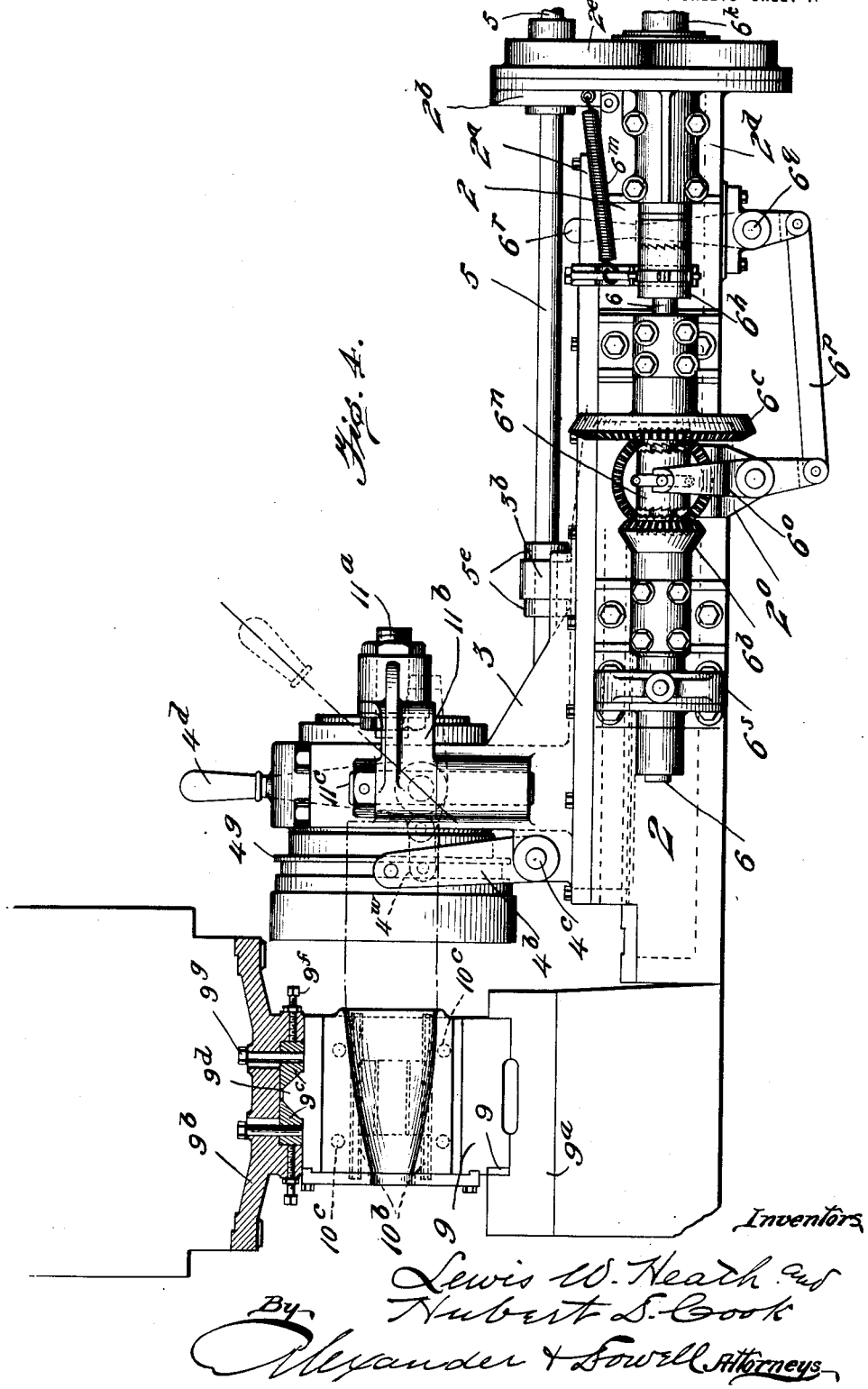

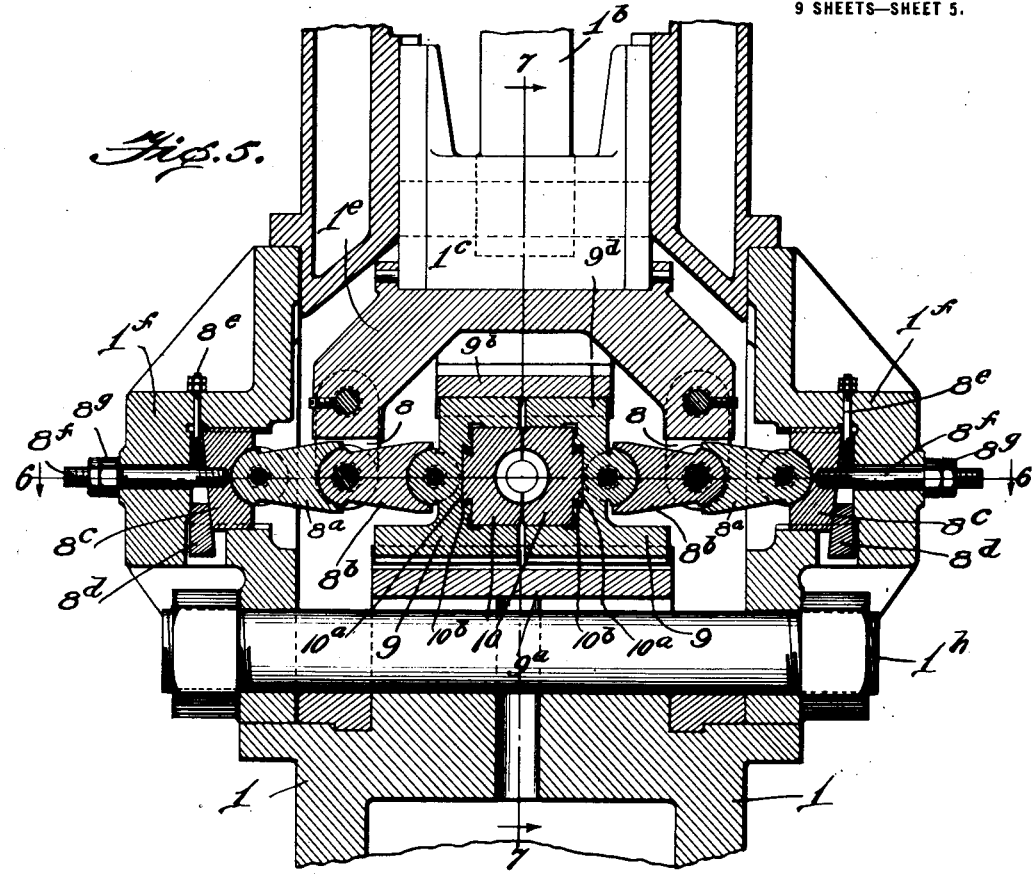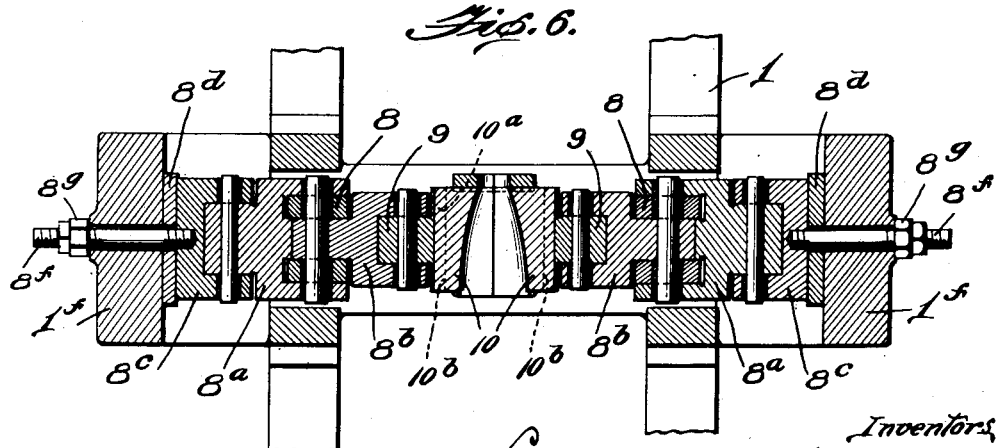

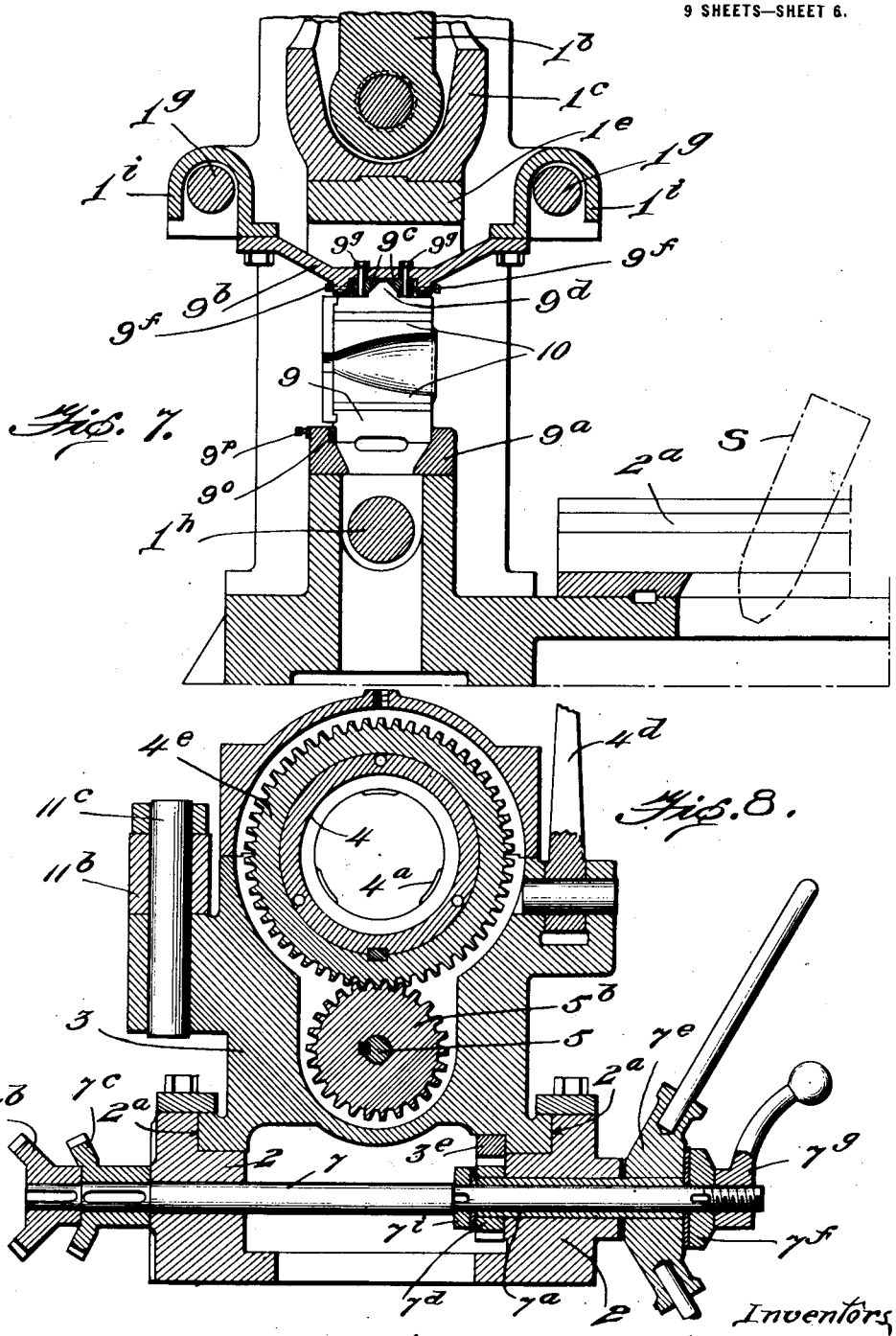

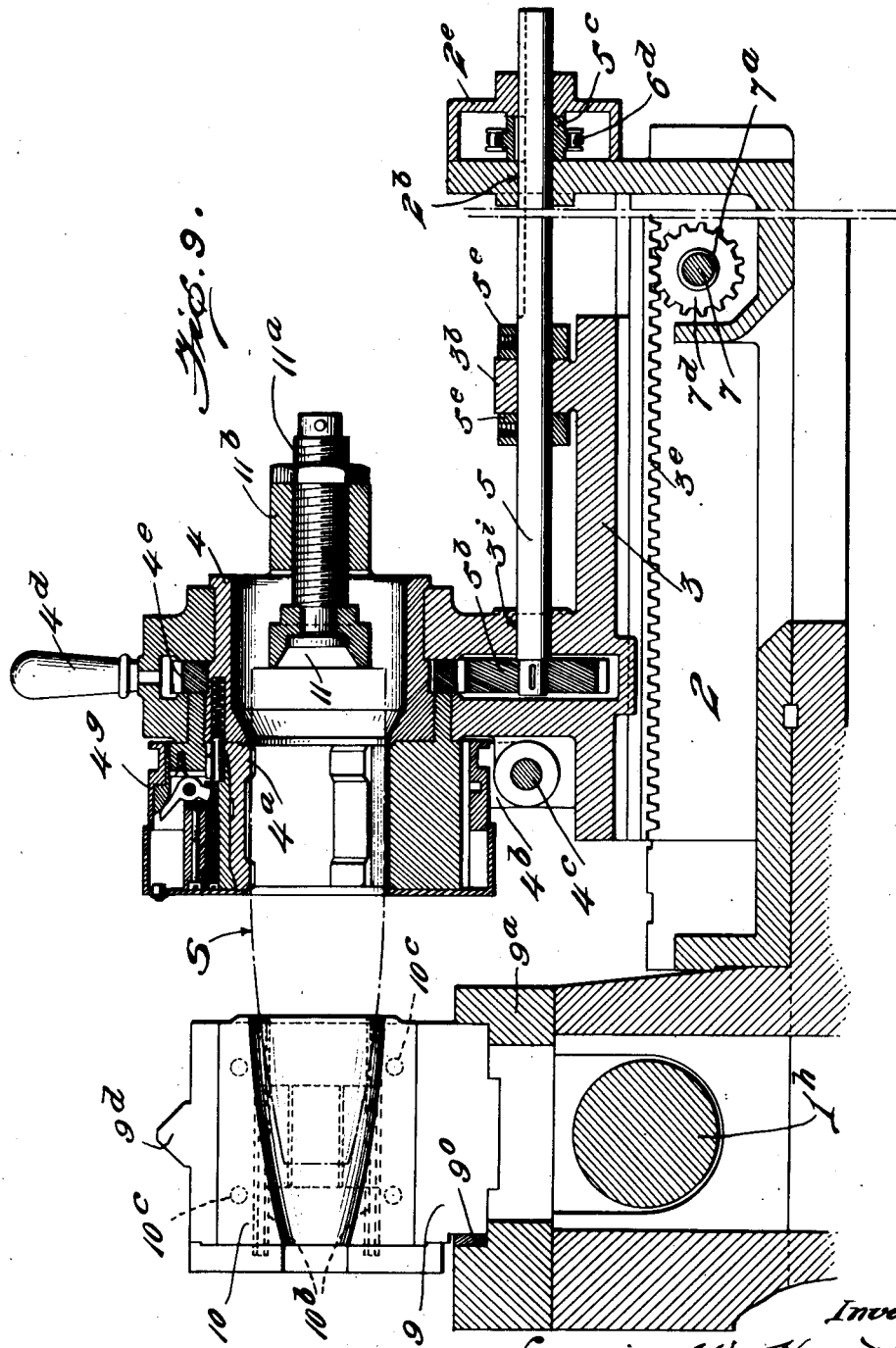

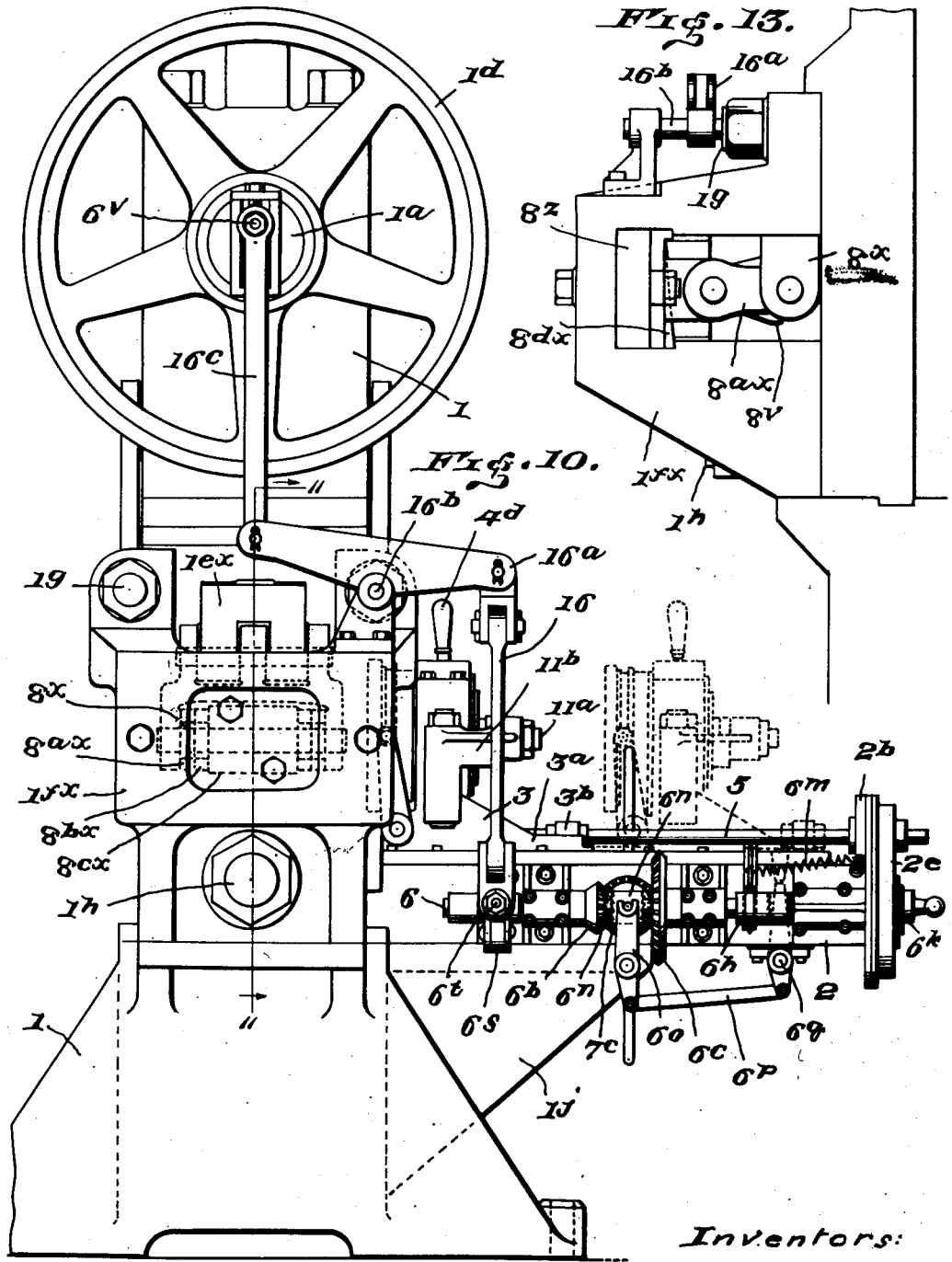

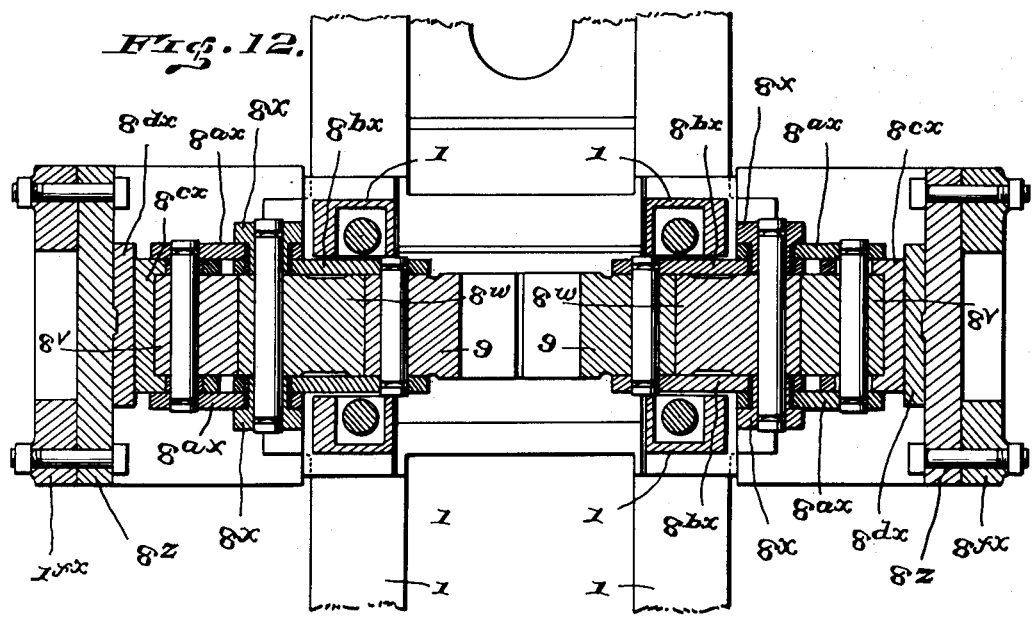
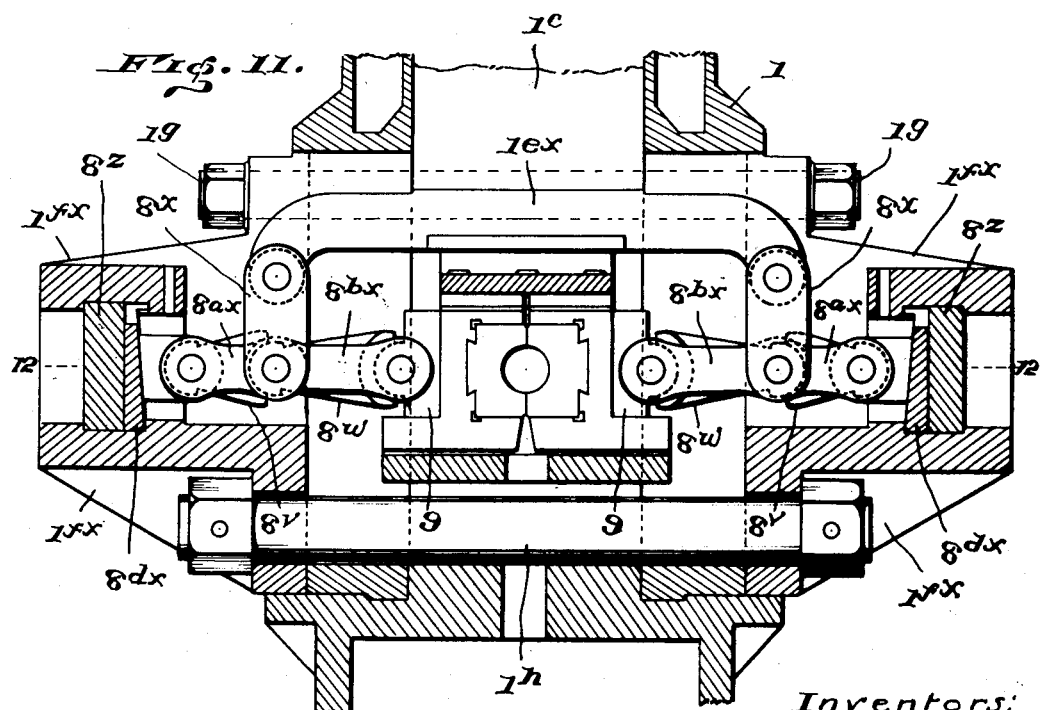

LEWIS W. HEATH AND HUBERT D. COOK, OF HASTINGS, MICHIGAN, ASSIGNORS TO CONSOLIDATED PRESS COMPANY, OF HASTINGS, MICHIGAN, A CORPORATION OF MICHIGAN.

SWAGING AND FORGING PRESS.

1,392,328.      Specification of Letters Patent.      Patented Oct. 4, 1921.

Application filed August 15, 1918. Serial No. 249,937.

*To all whom it may concern:*

Be it known that we, LEWIS W. HEATH and HUBERT D. COOK, citizens of the United States, residing at Hastings, in the county of Barry and State of Michigan, have invented certain new and useful Improvements in Swaging and Forging Presses; and we hereby declare that the following is a full, clear, and exact description thereof, reference being had to the accompanying drawings, which form part of this specification.

This invention is a novel swaging and forging press or machine, and is particularly designed for forging metal objects to an accurate size in order to minimize the subsequent machining or work required to completely finish such object.

In our invention pressure is comparatively gradually applied to the object instead of by a series of direct sharp blows such as would be the case if a hammer was used. The power or pressure in our invention is applied by a succession of squeezes rapidly exerted upon the object by dies, the object being preferably automatically fed to and revolved in the dies to insure a uniform amount of stock being reduced at each squeezing operation, and also insuring that the finished product shall have the correct contour.

Our invention enables two strokes or squeezes of the dies to be produced for each stroke of the press plunger; and this enables the fly-wheel to be run at a speed which will not be as dangerous to the operator, as would be the case if the fly-wheel made one revolution for each operation of the dies.

In our invention we are able to automatically feed the work into the dies and to revolve the work as it is fed in order to render the product more uniform; and to lessen danger of injuring the press or dies by overloading, which is liable with uncertain hand feeding. We are also able to increase production by thus automatically handling the work, and by relieving the operator of the necessity of feeding the object permitting him to bring a new object to the press ready for inserting therein while another is being operated upon.

Subsidiary objects of the invention are to deliver a series of rapid squeezes to the object by toggle means, as differentiated from the direct blows delivered by a hammer or ordinary standard type of press. To permit easy access to the chuck or work holder for inserting the object therein and correctly locating and clamping the object therein and ejecting the finished object. To so arrange the work holder that the operator can bring the work quickly to the dies, and the holder caused to automatically feed the work until completed. To employ the intensifying action of toggles to impart greater pressure upon the work than is applied at the crank shaft. To employ frictional or equivalent devices for operating the work feed, so that if the feed failed to release in either direction the devices would slip or yield and prevent damage to the working parts. To provide a work holding and feeding means that can be operated by hand or automatically. To operate both opposed dies in unison so that the work will not be distorted by forcing it into one die by the other, as would be the case if one die was stationary. To hold the work rigidly and feed it into the dies while they are moving, but before they come in contact with the work. To automatically intermittently revolve the work as it is being fed into the dies and before it is clamped thereby so as to insure thorough forging and obtain the correct contour of the part to be swaged or forged. To withdraw the work from the dies when the forging is completed, either by hand or automatically; and when the work holder is moved back into position to reload to automatically disconnect the rotating mechanism and after reloading the work holder to automatically restart the rotating mechanism when the work is advanced toward the dies. To enable the power feeding mechanism to be easily and quickly disconnected. To provide a universal feed which is simple, easy of access and applicable to a variety of work. To provide a powerful chuck which will grip the work and hold it rigidly and at the same time is so arranged that it can be revolved to give the work the correct contour, and be advanced to carry the work into the dies or reversed to withdraw it therefrom; and finally to accurately locate the position of the work in the chuck and automatically lock the locating piece in correct position simultaneously with the gripping thereof by the chuck.

In the accompanying drawings we have illustrated a practical apparatus embodying our invention and which is especially adapted for forging shells for heavy ordnance or like work, and the following explanation of such press will enable others skilled in the art to readily comprehend and understand the invention and to adapt and use the same for other purposes within the scope of the invention and of the broader claims following the description. We do not consider the invention restricted to the specific construction and arrangement of parts illustrated in the accompanying drawings and refer to the claims for summaries of the essential features and novel constructions and combinations of parts for which we desire protection.

In said drawings:

Figure 1 is a side elevation of the complete machine.

Fig. 2 is a front elevation thereof.

Fig. 3 is an enlarged plan view of the work holding and adjusting devices.

Fig. 4 is a side elevation of Fig. 3.

Fig. 5 is a detail vertical section on the line 5—5, Fig. 1.

Fig. 6 is a section on the line 6—6, Fig. 5.

Fig. 7 is a transverse section approximately on the line 7—7, Fig. 5.

Fig. 8 is a combined section through the work holder on the line 8—8, Fig. 3 and through the frame supporting the holder on the line $8^x$—$8^x$, Fig. 3.

Fig. 9 is an enlarged longitudinal section partly broken away on the line 9—9, Fig. 3.

Fig. 10 is a side elevation of a slight modification of the construction of the press.

Fig. 11 is an enlarged section through the die portion of the press on line 11—11, Fig. 10.

Fig. 12 is a horizontal section on the line 12—12, Fig. 11.

Fig. 13 is a detail showing a front elevation of one of the castings $1^{fx}$.

Referring to the drawings; the machine frame 1 may be of any suitable construction adapted to withstand the strains to which it is subjected. In this frame is journaled a crank shaft $1^a$ adapted to revolve in suitable bearings in the side uprights of said frame, and its crank is connected by a pitman $1^b$ to a plunger or slide $1^c$ properly guided for vertical movement in the frame. The crank shaft can be operated by means of belts (not shown) acting on the fly-wheels $1^d$, or by any other suitable means, such as are commonly used for power presses. Preferably power is applied to both fly-wheels $1^d$ to relieve torsional strain on the shaft.

To the lower end of the slide $1^c$ is fastened a yoke casting $1^e$, the opposite ends of which are connected by pairs of links 8 to the centers or knuckles of toggles formed by members $8^a$ and $8^b$ (see Figs. 5 and 6). The outer members $8^a$ are pivoted to abutments $8^c$ which are adjustably mounted in castings $1^f$ secured to the side uprights or member of the frame, and may be adjusted by means of wedges $8^d$ and bolts $8^e$, and fastened by stud bolts $8^f$ provided with lock nuts $8^g$ as shown. As shown in Figs. 2 and 5 the toggles 8 extend through openings in the side members of the main frame and the abutment $8^c$ and their adjusting devices are supported in suitable recesses in castings $1^f$ securely attached to the side members of the frame by means of through bolts $1^g$ and $1^h$ secured by suitable nuts on the ends; the castings $1^f$ being spaced apart by spacer castings $1^i$; and the bolts bond the castings securely to the uprights of the main frame, making a practically unitary structure.

The inner ends of members $8^b$ of the toggles are pivotally connected to opposite slides 9 (see Figs. 5 and 6) which are mounted in upper and lower guides $9^b$ and $9^a$ rigidly mounted in the frame; the guide $9^a$ has a longitudinal channel for the reception of the bases of the slides 9, which may be slidably confined and adjusted therein by means of gibs $9^c$ which may be adjusted by tap bolts $9^p$ as indicated in Fig. 7. The guide $9^b$ may be secured to the frame in any suitable manner being shown as bolted to the under side of the spacer castings $1^i$ beneath the cross-head $1^c$. Said guide $9^b$ has beveled gibs $9^c$ adapted to engage the opposite sides of a beveled rib $9^b$ on the top of the slide 9; said gibs $9^c$ can be adjusted by means of tap bolts $9^f$ and $9^g$.

A yoke $1^e$ extends over and across the slide $9^b$ and has its ends bent downward at opposite sides of the guide $9^b$ in position to carry the links 8 directly over the knuckles of the toggles.

The inner faces of the opposed slides 9 are recessed for the reception of opposed die members 10. The complemental working faces of the opposite die members correspond in contour to the exterior form of the object to be operated upon; this, in the example shown, being the nose or point of a projectile or shell S.

The die members 10 may be removably secured in the slides in any suitable manner. As shown in Fig. 5 each die member has a dovetailed rib $10^a$ on its rear face engaging a corresponding dovetailed groove in the adjacent slide, and secured therein by means of tapered wedge plates $10^b$ and pins $10^c$ (Fig. 4). The particular means for fastening the die members to the slides is not a feature of the present invention.

The stroke of the crank shaft in the press is preferably such that the toggles attached to the slides and operating the die holders move an equal distance above and below, or each side of the true dead center line of the toggles; thus imparting two working strokes to the die members for each stroke of the press plunger, and at the same time giving twice the number of strokes to the dies for each revolution of the main shaft; and permitting a moderate flywheel speed.

Mounted upon the base of the frame and supported by a bracket 1$^j$ attached thereto is a frame or casting which supports the slidable work holder and mechanisms for operating such work holder. On this supporting frame is a work carriage carrying a suitable work holder in which may be held the shell, tube, forging or other object to be swaged or forged into shape. The work holder is operated to automatically feed the work to the dies and to revolve the work intermediate successive forging operations of the die in order that the die will more uniformly finish the work; the amount of longitudinal feed and revolution of the work intermediate each forging operation can be easily regulated; so also can the total length of feed; and the feed of the work is automatically stopped when a predetermined point is reached.

As shown the work supporting frame has rigidly connected side members 2 provided with guides 2$^a$ for the base member 3$^a$ of a sliding work carriage 3. The carriage is axially alined on the frame and can be properly located by slides and gibs in the well known manner.

The carriage 3 carries a rotatable sleeve 4 axially disposed thereon, and into which sleeve the article to be operated upon (in the example shown a projectile or shell S) is inserted. The inner end of this sleeve is provided with a chuck 4$^a$, which may be of any suitable construction, adapted to clamp and hold the object after the same is properly inserted in the sleeve. In the example shown the shell S is inserted in the sleeve and pushed through the chuck until the point of the shell projects beyond the chuck the desired distance; than the chuck is closed so as to clamp the shell.

The sliding member 4$^g$ of the chuck which actuates the locking and unlocking devices thereof may be operated by arms 4$^b$ attached to a rock-shaft 4$^c$, and actuated by a lever 4$^d$ pivotally mounted on the carriage 3, and connected with the adjacent arm 4$^b$ by a link 4$^w$. The lever 4$^d$ may be manually shifted by the operator when it is desired to clamp or release the shell. The construction of the chuck *per se* forms no part of the present invention and therefore it is unnecessary to describe the same in detail as any suitable chuck may be used; but the chuck is mounted upon the sleeve 4 and rotates therewith.

The object to be forged such as a shell, may be placed in the holder by inserting it point first into the sleeve and pushing it into the chuck. It is then correctly positioned in the chuck by means of the work adjusting member 11 which is rotatably mounted on a screw 11$^a$ adjustably mounted on a supporting arm 11$^b$ which is pivoted at one end of a bolt 11$^c$ attached to one side of the bearing of the sleeve 4. The free end of this supporting arm is provided with a lug 11$^e$ which is adapted to be engaged by the end of an arm 4$^f$ attached to the lever 4$^d$ when the clutch is engaged with the shell.

When work such as a shell is to be inserted in the sleeve the arm 11$^b$ is thrown back out of the way, the shell is then inserted in the sleeve approximately in position, then the lever 11$^b$ is swung inward and the clutch engages the inner end of the shell as indicated in Figs. 3 and 9 and as lever 4$^d$ is shifted to cause the clutch to engage the shell the arm 4$^f$ engages the lug 11$^e$ of the lever 11$^b$ and causes the work holder 11 to position the shell within the clutch just before the latter finally clamps the shell. After the shell has been treated and the work holder retracted to shell receiving position the clutch is released by properly moving lever 4$^d$, this simultaneously releases the arm 11$^b$ which is then thrown back out of the way; then another shell is shoved into position and in so doing the previously formed shell is ejected by the incoming shell, the finished shell dropping through an opening into the work supporting frame as indicated in Fig. 7 onto a suitable receiver; and as the new shell is approximately properly positioned lever 4$^d$ is closed and the shell properly positioned by the engagement of the arm 4$^f$ with the lever 11$^b$ upon the closing of the chuck as above described.

The sleeve 4 is provided with a ring gear 4$^e$ which meshes with a pinion 5$^b$ on a counter shaft 5, (see Figs. 3, 8 and 9) the inner end of which shaft is journaled in bearings 3$^i$ and 3$^b$ on the carriage, and its outer end is slidably supported in bearing 2$^b$ on the outer end of the work supporting frame. On the outer end of shaft 5 is splined a sprocket pinion 5$^c$ confined against longitudinal movement by a suitable housing 2$^e$ attached to end of the frame 2.

The gear 5$^c$ is splined on shaft 5 so that it will be rotated thereby while the shaft can slide longitudinally through the gear. Longitudinal movement of the shaft 5 relative to the carriage 3 may be prevented by collars 5$^e$ pinned to the shaft at opposite sides of the journal bearing 3$^b$. In this way the carriage 3 may be moved backward or forward along the frame 2 and the shaft 5 rotated in all positions of the carriage.

The shaft 5 may be driven by any suitable means; preferably from a countershaft 6 (see Figs. 3 and 4) which is shown as supported in brackets $2^c$ and $2^d$ bolted to the outer side of the work supporting frame. As shown a sprocket gear $6^a$ on a shaft 66 axially alined with shaft 6 drives pinion $5^c$ by means of a sprocket chain $6^d$, and said sprocket gears and chain may be inclosed in the casing $2^e$ as shown. Preferably the gear $6^a$ is frictionally clutched to shaft 66, by any suitable means, and shaft 66 is clutched to shaft 6 as hereinafter described.

Preferably the shaft 6 also operates the mechanism for advancing and retracting the carriage 3. As shown on shaft 6 between the brackets $2^c$ and $2^d$ are loosely mounted bevel gears $6^b$ and $6^c$ (see Figs. 3, 4 and 8) the latter being preferably of larger diameter than the former. Each of these gears is provided with a clutch face on its inner side; and between these gears and splined on the shaft is a double clutch member $6^n$, which may be engaged with either gear $6^b$ or $6^c$ so as to cause either one or the other to rotate with the shaft 6.

Gear $6^b$ meshes with a gear $7^b$ fast on a shaft 7 and gear $6^c$ meshes with a gear $7^c$ also fast on a shaft 7. This shaft 7 is suitably journaled in bearings in the work supporting frame (see Fig. 8) and extends beneath and transversely of the carriage 3.

Preferably surrounding the shaft 7 and extending through the bearing thereof at the side of the work supporting frame opposite shaft 6 is a sleeve $7^a$ on the inner end of which is fast a pinion $7^d$ that meshes with a rack $3^e$ attached to the under side of the carriage 3, as shown, and a hand wheel $7^e$ is fast to the outer end of sleeve $7^a$. On the shaft 7 exterior to the star-wheel is keyed a friction disk $7^f$; and fixed to the shaft 7 at the inner end of the sleeve $7^a$ is a collar $7^i$. The sleeve $7^a$ can be forcibly clamped between the disk $7^f$ and collar $7^i$ by means of a hand nut $7^g$ which is screwed on the outer threaded end of the shaft 7. When the sleeve is thus clamped it will be caused to rotate with the shaft 7 and through pinion $7^d$ meshing with rack $3^e$ operate the carriage 3. When the carriage 3 is moved inward the shaft 7 is operated by the gear $7^b$ meshing with the gear $6^b$; and when the carriage is retracted it is operated by the gear $7^c$ meshing with the gear $6^c$, so that it can be retracted more rapidly than it is advanced. As the carriage moves inward to present the work to the die the shaft 5 is rotated intermittently between successive operations of the die by reason of the intermittent rotation of the shaft 6 as hereinafter described.

The gear $6^a$ may be frictionally driven from the shaft 6 by any suitable means. As shown in Fig. 3 a short shaft 66 is journaled in bracket $2^d$ in axial alinement with shaft 6. A sleeve $6^f$ surrounds shaft 66 and extends through the bearing for the shaft 66 and on the outer end of the sleeve is a disk $6^i$, and on the inner end of the sleeve is a collar which bears against a clutch member $6^g$ fast to the inner end of shaft 66. The gear $6^a$ is loosely mounted on shaft 66 and fastened to disk $6^i$. A friction disk $6^j$ is splined to shaft 6; and adjustable toward gear $6^a$ by means of a hand nut $6^k$ screwed on the threaded outer end of shaft 66 as shown, and by adjusting nut $6^k$ the sleeve $6^f$ and gear $6^a$ can be frictionally clamped between clutch member $6^g$ and disk $6^j$ so that gear $6^a$ is caused to turn with the shaft 66.

The clutch member $6^g$ is adapted to be engaged by an opposed clutch member $6^h$ slidably keyed on the adjacent end of the shaft 6.

The clutch member $6^h$ is normally held in engagement with the member $6^g$ by means of a lever $6^l$ pivoted on the bracket $2^d$; and the inner end of this lever projects into the path of the carriage 3 so as to be engaged thereby when the latter moves backward or outward, and rocked so as to disengage clutch member $6^h$ from member $6^g$, so that when the carriage is fully retracted said clutch will be disengaged and shaft 5 will be stopped notwithstanding that shaft 6 continues to be intermittently rotated. When the carriage is moved inward it will release the lever $6^l$ and the latter is then moved by spring $6^m$ so as to reëngage the clutch members $6^h$ and $6^g$ thus automatically restarting the shaft 5 into operation.

The clutch member $6^n$ may be manually operated by a lever $6^o$ pivoted on a bracket $2^o$ (Figs. 3 and 4) attached to the side of the work supporting frame. The other arm of this lever being connected by a link $6^p$ to an arm on a rock shaft $6^q$ which is suitably journaled in bearings on the work supporting frame and preferably extends to the opposite side of such frame and is provided with a handle lever $6^r$ by which the lever $6^o$ can be shifted as desired. The lever $6^r$ may be provided with any suitable means for holding it in position to disengage clutch $6^n$ from both gears $6^b$ and $6^c$, or in engagement with either one of said gears. By moving said lever $6^r$ to one extreme position clutch member $6^n$ will be engaged with the gear $6^b$; and by moving said lever to the other extreme position the member $6^n$ will be engaged with the gear $6^c$; and in the intermediate position (Fig. 3) clutch member $6^n$ will be disengaged from both gears $6^b$ and $6^c$.

The shaft 6 is preferably rotated intermittently by any suitable means. As shown in Figs. 1-3 one member $6^s$ of a suitable rotary ratchet is keyed to the shaft 6 and the other member has an arm $6^t$, the outer end of which is connected by a pitman $6^u$ to a crank pin $6^v$ on one end of the shaft $1^a$, so that for each rotation of the shaft 1 a partial rotation is imparted to the shaft 6.

The crank pin 6ᵛ may be adjusted in the usual manner radially of shaft 1ᵃ so that the amount of rotary motion imparted to shaft 6 for each rotation of shaft 1ᵃ can be suitably regulated.

In the construction shown in Figs. 10–13 the yoke 1ᵉˣ has its ends extended out through openings in the side members of the main frame 1; and the inner links 8ᵇˣ of the toggles are made longer than the outer links 8ᵃˣ so that the links 8ˣ and the pivots connecting the links 8ˣ to the ends of the yoke 1ᵉ and to the knuckles of the toggles are outside of the main frame and accessible at the side of the frame through openings in the side castings 1ᶠˣ in which the plates 8ᶜˣ and wedge 8ᵈˣ are mounted. The castings 1ᶠˣ are provided with removable wear plates 8ᶻ against which the wedges 8ᵈˣ bear. In this construction the toggle mechanism is more readily accessible for assembling, inspection and repair than the construction shown in Figs. 1 to 9.

In this construction also instead of connecting the arm of the ratchet member 6ᵗ directly to the crank pin 6ᵛ by a rod 6ᵘ as in Fig. 1; the arm 6ᵗ is connected by a rod 16 to one end of an oscillating lever 16ᵃ pivoted at 16ᵇ upon a bracket on the adjacent side casting 1ᶠˣ; and the other end of the lever 16ᵃ is connected by a rod 16ᶜ to the crank pin 6ᵛ. This construction enables us to obtain any desired amplification of movement between the wrist pin 6ᵛ and the ratchet member 6ᵗ and the pull on arm 6ᵗ is more direct.

Other parts of the press shown in Figs. 10–13 are constructed substantially as above described and are similarly lettered, and such presses operate alike.

The guides 9ᵃ and 9ᵇ fastened to the main frame of the press both guide the dies and keep them in proper alinement. Both the upper and lower guides 9ᵇ, 9ᵃ have provision for adjustment to compensate for any wear, and to enable the dies to be kept in correct relative position.

Referring to Fig. 5 the plunger 1ᶜ is shown when the crank is midway of its down stroke and the toggles 8ᵃ, 8ᵇ are then straightened in line, and the slides 9, 9 are moved nearest together. Preferably the crank is arranged so that the toggle and connected parts assume the positions shown in Fig. 5 on both the half-way down and half-way up strokes of the plunger 1ᶜ and thus the slides 9, 9 will make two reciprocations for each revolution of the crank shaft or reciprocations of plunger.

Obviously we could use this same construction and obtain one stroke of slides 9, 9 to one stroke of the crank shaft, by so proportioning the parts that the toggles 8ᵃ, 8ᵇ will only be straightened when plunger 1ᶜ reaches the end of either its up or down stroke. We however prefer to so proportion the parts that the toggles are straightened when the plunger 1ᶜ reaches the center of both its up and down strokes thus making two swaging operations for each reciprocation of slide 1ᵉ.

*Operation.*

For the purpose of explanation, assume that the nose of a shell S is to be forged and that suitable dies 10 for this work are placed in the holders 9. The carriage 3 is first retracted to the position indicated in dotted lines in Fig. 1 in order to place a shell in the chuck, and the carriage engages lever 6ˡ causing it to disengage clutch member 6ʰ from the clutch member 6ᵍ on the sleeve 6ᶠ and although shaft 6 is intermittently revolved as it is actuated by clutch member 6ᵗ, the remainder of the mechanism on the work supporting frame will be at rest.

The chuck 4ᵃ is then released and lever 11ᵇ swung out of the way to permit a shell to be inserted into the chuck. After the shell is inserted, the lever 11ᵇ is swung back into place, the work holder 11 being adjusted to properly locate the shell in the chuck for nosing when lever 11ᵇ is locked. Lever 4ᵈ is then moved over closing the chuck and gripping the shell, and at the same time the extension 4ᶠ of lever 4ᵈ swings behind the extension 11ᵉ of lever 11ᵇ and by its cam action locks lever 11ᵇ to accurately position the shell.

If the distance from the front end of the shell to the dies is such that it would require an undesirable length of time to automatically feed the work to the dies, the nut 7ᵍ can be moved to release the friction binding sleeve 7ᵃ to shaft 7, and the operator can then manually operate pinion 7ᵈ by the hand wheel to rapidly bring the work up to the dies; then the automatic feed can be reengaged.

When the carriage is moved inward toward the dies the clutch lever 6ˡ is released and spring 6ᵐ returns said lever to its original position and thereby throws clutch member 6ʰ into engagement with clutch member 6ᵍ on shaft 66 causing said shaft and sleeve 6ᶠ to revolve with shaft 6; and as gear 6ᵃ revolves with sleeve 6ᶠ, it in turn by chain 6ᵈ causes pinion 5ᶜ to revolve with it. Ring gear 4ᵉ meshing with pinion 5ᵇ causes the chuck to revolve the work as it enters the die and when it is not clamped by the die.

In order to secure longitudinal feed of the work in conjunction with the rotation thereof, the clutch lever 6ʳ is operated to throw clutch 6ⁿ into mesh with clutch face on gear 6ᵇ. This gear being in mesh with gear 7ᵇ keyed to shaft 7 causes the latter to revolve and assuming sleeve 7ᵃ is frictionally formed to revolve with the shaft 7, pinion $7^d$ meshing with the rack $3^e$ will feed the slide or carriage 3 automatically inward; and the work is fed into the die a predetermined amount at each revolution of the crank shaft $1^a$; and is also revolved through a predetermined angle or arc at each feeding operation while the dies are disengaged from the work.

By thus automatically intermittently feeding the work into the die and partly revolving the work intermediate the forging operations of the die the resultant product will be more uniformly and better finished, and there will be less liability of the press or dies being injured by overloading or overfeeding; and by thus automatically handling the work and relieving the operator of the necessity of feeding the work the production or output is increased as while one piece of work is being operated upon another piece of work can be made ready for insertion in the work holder by the operator.

The powerful squeezing swaging action of the dies caused by the toggles is very desirable on work of this nature; and as the pressure of the crank is applied to the work through toggles, much greater pressure can be exerted on the work than by the ordinary crank motions using the same size of crank shaft. The power is also applied more slowly and gradually as the toggles are straightened out, thus giving the metal more opportunity to "flow" to the shape desired.

It is also desirable to have both die members operated, instead of having one stationary and one movable as is generally the case. This is particularly important in producing exact fine work, because if the work was to be forced into a stationary die, and the work forged or swaged to conform to the die shape after it is forced into position, there would be a great tendency to force the work or die members out of alinement and the product would not likely be uniform.

We prefer to keep the work always traveling in one direction; therefore as one shell is being placed in the chuck the one which has just previously been nosed or swaged is ejected from the front of the chuck by the incoming shell and can slide down through an opening in the bottom of the work supporting frame onto a receiver or conveyer to be carried away.

Our press is capable of running at high speed and is preferably so arranged that two swaging operations are performed on the work for each rotation of the main crank shaft; and the machine is solidly constructed in such a manner as to withstand the strains exerted upon it by the making and breaking of the toggles operating the dies; and suitable provision is made for adjusting the toggles, die holders and dies to compensate for wear on the working parts. The movement of the carriage can be automatically reversed, if desired; and its return movement is made at a higher speed than its advancing movement, by reason of the difference in ratio of the forward and reverse feed gears. We provide for both a hand operated quick advance feed, or quick return; and also for a power-operated predetermined forward feed and quicker reverse movement of the carriage.

What we claim is:

1. In a forging and swaging press the combination of a main frame having openings in its sides, recessed castings connected to the frame opposite said openings, spacing members interposed between the opposite castings, tie bolts extending through said spacing members and said castings and binding the same to the frame, a reciprocating plunger, slide guides, slides mounted in said guides, die members carried by said slides, toggles connected with the slides and with abutments in said castings, and means connecting said plunger with the said toggles to straighten and break them.

2. In a forging and swaging press the combination of a main frame having openings in its sides, recessed castings connected to the frame opposite said openings, spacing members interposed between the opposite castings, tie bolts extending through said spacing members and said castings and binding the same to the frame, a reciprocating plunger, slide guides, slides mounted in said guides, die members carried by said slides, toggles connected with the slides and with abutments in said castings, a member connected with the plunger and projecting into the openings of the side frame, and links connecting said member with the said toggles to straighten and break them.

3. In combination a slidable carriage, a rotatable work holder thereon, means for engaging or releasing the work, a shaft geared to said work holder for rotating same, a countershaft, means for driving the said work holder shaft from said countershaft, a clutch for locking the driving means to the counter-shaft, a spring for normally engaging the clutch, and means adapted to be operated by the carriage for disengaging the clutch when the carriage is retracted.

4. In combination a slidable carriage, a rotatable work holding sleeve thereon having a chuck, a shaft movable with the carriage and geared to said work holder for rotating same, a counter-shaft, frictional controlled means for driving the said shaft from said counter-shaft, a clutch for locking the frictional means to the counter-shaft, a spring for normally engaging the clutch, and a lever adapted to be operated by the carriage for disengaging the clutch when the carriage is retracted.

5. In combination a slidable carriage, a rotatable work holder thereon including a chuck, means for opening or closing the chuck, a shaft geared to said work holder for rotating same, a transverse shaft, a pinion on said transverse shaft, a rack on the carriage engaging said pinion, means for locking this pinion to the transverse shaft; a counter-shaft, opposite gears on said counter-shaft, pinions on the transverse shaft respectively engaging said gears, clutch means for locking either of said gears to the counter shaft, and means for actuating the counter-shaft, substantially as described.

6. In combination a slidable carriage, a rotatable work holder thereon including a chuck, a shaft geared to said work holder for rotating same, a transverse shaft, a pinion on said shaft, a rack on the carriage engaging said pinion, a counter-shaft, opposite gears on said counter-shaft; pinions on the transverse shaft respectively engaging said gears; and a clutch for locking either of said gears to the driven shaft; with frictionally controlled means for driving the work holder operating shaft from the said counter-shaft, and means for intermittently actuating the counter-shaft; whereby the carriage is advanced intermittently and the work holder rotated intermittently as it is advanced.

7. In a forging and swaging press the combination of a slidable carriage, a rotatable work holding sleeve thereon including a chuck, a work positioning lever connected with said carriage, a shaft movable with the carriage and geared to said work holder for rotating same, a counter-shaft, frictionally controlled mechanism for driving the said shaft from said countershaft; a clutch for locking the frictional means to the countershaft, a spring for normally engaging the clutch, and a lever for disengaging the clutch adapted to be operated by the carriage when it is retracted; with a transverse shaft, a pinion on said shaft, a rack on the carriage engaging said pinion, opposite gears on said counter-shaft, pinions on the transverse shaft respectively engaging said gears, and clutch means for locking either of said gears to the counter-shaft, and means for actuating the counter-shaft, substantially as described.

8. In a forging and swaging press, the combination of a slidable carriage, a rotatable work holding sleeve thereon provided with work clamping means, a lever pivoted to the carriage, a work positioning member adjustably connected with said lever; a lever on the carriage for operating the work clamping device and locking the work positioning lever.

9. In a forging and swaging press the combination of a slidable carriage, a rotatable work holding sleeve thereon provided with a work clamping means, a lever pivoted to the carriage, a work positioning member adjustably connected with said lever, a lever on the carriage for operating the work clamping device and locking the work positioning lever; with means for intermittently advancing the carriage and means for rotating the sleeve intermittently between successive forging operations.

10. In a forging and swaging press the combination of a slidable carriage, a rotatable work holding sleeve thereon provided with work clamping means, a lever pivoted to the carriage, a work positioning member adjustably connected with said lever; a lever on the carriage for operating the work clamping device and locking the work positioning lever; with a shaft attached to said carriage and movable therewith, gearing between the shaft and sleeve for rotating the latter, a counter-shaft, connections between the counter-shaft and said shaft for operating the latter; a transverse shaft, gearing between the transverse shaft and the carriage for reciprocating the carriage, and gearing between the transverse shaft and counter-shaft for operating the transverse shaft.

11. In combination a slidable carriage, a rotatable work holding sleeve, a chuck on said sleeve, a shaft movable with the carriage and geared to said work holder for rotating same, a counter-shaft, manually controlled frictional means for driving the said work shaft from said counter-shaft, a clutch for locking the frictional means to the counter-shaft, a spring for normally engaging the clutch, a lever adapted to be operated by the carriage for disengaging the clutch when the carriage is retracted and manually and mechanically controlled means for moving the carriage.

12. In combination a slidable carriage, a rotatable work holder thereon including a chuck, means for opening or closing the chuck, a shaft geared to said work holder for rotating same, a transverse shaft, a pinion on said shaft, a rack on the carriage engaging said pinion, means for manually operating said pinion, means for locking this pinion to the transverse shaft, a counter-shaft, opposite gears on said counter-shaft and pinions on the transverse shaft respectively engaging said gears, clutch means for locking either of said gears to the counter-shaft, and means for actuating the counter-shaft.

13. In combination a slidable carriage, a rotatable work holder thereon including a chuck, a shaft geared to said work holder for rotating same, a transverse shaft, a pinion on said shaft, a rack on the carriage engaging said pinion, means for manually operating said pinion, means for locking this pinion to the transverse shaft, a counter-shaft, opposite gears on said counter-shaft, pinions on the transverse shaft respectively engaging said gears; and a clutch for locking either of said gears to the driven shaft; with frictionally controlled means for driving the work holder operating shaft from said counter-shaft, a clutch for locking the frictional means to the counter-shaft and means for intermittently actuating the counter-shaft, whereby the carriage is advanced intermittently and the holder is rotated intermittently as it is advanced.

In testimony that we claim the foregoing as our own we affix our signatures.

LEWIS W. HEATH.
HUBERT D. COOK.